United States Patent [19]

Schneider et al.

[11] 4,302,232
[45] Nov. 24, 1981

[54] PROCESS FOR THE PRODUCTION OF A GLASS FIBER LIGHT WAVEGUIDE

[75] Inventors: Hartmut Schneider; Alfred Papp, both of Munich, Fed. Rep. of Germany

[73] Assignee: Siemens Aktiengesellschaft, Berlin & Munich, Fed. Rep. of Germany

[21] Appl. No.: 119,099

[22] Filed: Feb. 6, 1980

[30] Foreign Application Priority Data

Feb. 28, 1979 [DE] Fed. Rep. of Germany ....... 2907731

[51] Int. Cl.³ .................. C03B 37/00; C03C 17/02
[52] U.S. Cl. .................................. 65/3.12; 65/60.8; 427/163; 427/231
[58] Field of Search ................. 65/3 A, 60 R, 3.12, 65/18.2; 427/163, 231

[56] References Cited

U.S. PATENT DOCUMENTS 3,574,033 4/1971 Kolkman et al. ............... 427/231 X
4,154,591 5/1979 French et al. .................... 65/3 A X
4,165,224 8/1979 Irven et al. ........................ 65/3 A

FOREIGN PATENT DOCUMENTS 2625010 12/1976 Fed. Rep. of Germany .
1501586 2/1978 United Kingdom .

OTHER PUBLICATIONS

Geittner et al., "Low-Loss Optical Fibers Prepared by Plasma-Activated CVD", *Applied Physics Letter*, vol. 28, No. 11, Jun. 1, 1976, pp. 645-646.

*Primary Examiner*—Richard V. Fisher
*Attorney, Agent, or Firm*—Hill, Van Santen, Steadman, Chiara & Simpson

[57] ABSTRACT

A chemical vapor deposition process characterized by depositing a layer of glass on an interior surface of a tube with each cycle for depositing a layer comprising depositing a glass forming substance on the interior surface and subsequently converting the layer as the tube is rotated and between each cycle for each additional layer either changing the direction of rotation of the tube or the initial starting position for starting the transformation and maintaining an increased gas pressure within the tube during the entire forming step. In addition, when the tube is collapsed or formed into a rod so that an optical fiber can be drawn from an end thereof, the gas pressure is also maintained in the uncollapsed portion of the tube.

12 Claims, 1 Drawing Figure

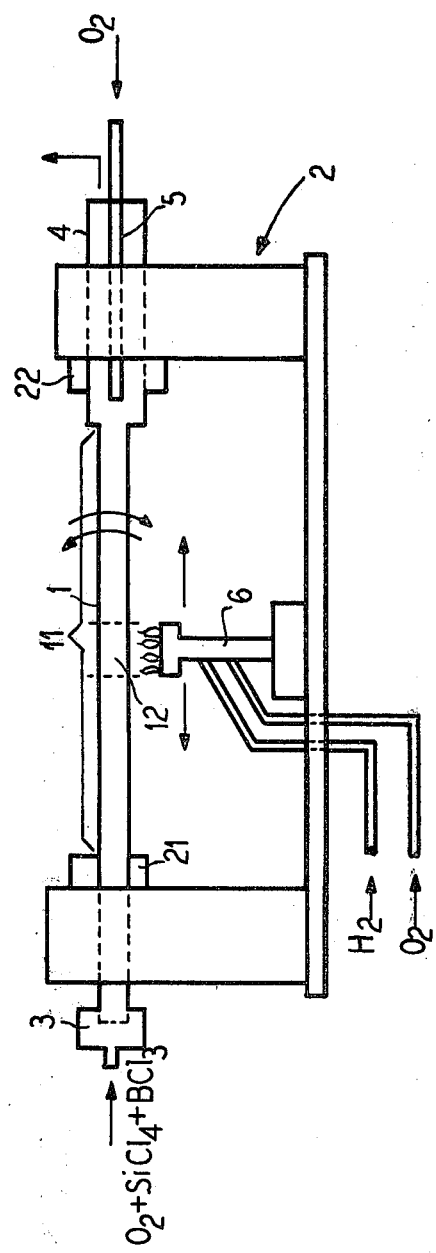

PROCESS FOR THE PRODUCTION OF A GLASS FIBER LIGHT WAVEGUIDE

BACKGROUND OF THE INVENTION

The present invention is directed to a process for the production of glass fiber light waveguides or conductors. The process involves chemical vapor deposition (CVD) and comprises forming glass layers on an inner surface of a rotating glass tube in a cycle which includes applying a layer of a substance from a flow of gas through the tube, subsequently transforming each applied layer of the substance into a glass layer, and then deforming or collapsing the internally coated glass tube into a rod from which a fiber is subsequently drawn.

An example of a process of a type in which a glass forming substance or glass substance is deposited on an inner surface of a tube and then transformed into a glass layer are generally known as a chemical vapor deposition (CVD) process. An example of such process is described in an article by P. Geittner et al, "Low-Loss Optical Fibers Prepared by Plasma-Activated Chemical Vapor Desposition (CVD)", *Applied Physics Letter*, Vol. 28, No. 11, June 1, 1976, pp. 645-6, and also in the articles mentioned in the footnotes 1-3 of this article. This tube is then formed into a rod and a fiber can then be drawn therefrom. A fiber which was formed by this process as well as fibers produced by a double crucible method have been proved to have the properties of being either depolarizing, birefringent, or optically active.

Practical applications for fibers, frequently required fibers which are neither depolarizing, birefringent nor optically active. For example, monomode glass fibers, which can be produced by a process as described above, would be predominantly suitable for the transmission of short light pulses in communication technology if the propagation delays between the two orthogonally polarized states of the fundamental mode in the fiber did not occur and thus undesireable reductions in the information transmission were not present in the fiber. Many other applications of the fiber will require a predetermined polarization of the emerging light. This occurs in interferometric processes such as a fiber optical rotation measurement process and in magneto-optical processes such as a fiber optical current strength meansurement process.

The origin of the undesireable properties of the real glass fibers includes deviations of the fiber core from the cylindrical symmetry or the anisotropy property of the material.

SUMMARY OF THE INVENTION

The present invention is directed to an improved process for creating glass layers by a chemical vapor deposition process on the interior of a glass tube which is subsequently formed into a rod and has a fiber drawn therefrom and which process produces a fiber which has an improved cylindrical symmetry for the core and has a reduced anisotropy of the material.

The objects of the present invention are accomplished by an improvement in a process for the production of glass fiber light waveguides, said process including a chemical vapor depositing process in which a glass layer is formed in a cycle including flowing a gas through a glass tube from one end to the other to deposit a glass forming substance on an inner surface of the tube and subsequently transforming the glass forming substance into a layer of glass, repeating the cycle to obtain the desired number of glass layers, subsequently forming the internally coated glass tube into a rod and then drawing an optical fiber from an end of said rod. The improvement comprises during each cycle of depositing a glass forming substance and then transforming it into a glass layer, applying a gas pressure to the interior of the tube with the gas pressure being increased relative to the external environment of the tube, wherein the step of transforming the glass forming substance into a glass layer includes rotating the tube, locally heating the tube to create a heating zone to transform the deposit into the glass layer, moving the heating zone along a predetermined path on the tube and selectively changing at least one of the direction of rotations of the tube and the rotary position of the starting point of the path of the heating zone after each cycle so that the effects of anisotropy on the glass layers is largely eliminated.

The application of the increased pressure improves the cylindrical symmetry of the fiber core and the change in either the direction of rotation of the tube relative to the direction of travel and/or the starting point of the path of travel of the heating zone reduces anisotropy in the material.

The improvement of the present invention is also based on the principal that in order to produce a finished glass layer which is subject to asymmetry, it is necessary to produce a glass layer which has an opposite asymmetry to that of the asymmetry of the preceding glass layer. Thus, the glass layers mutually compensate for each other.

In order to produce and maintain the increased gas pressure it is advantageous to additionally blow gas into the end opposite from the end in which the gas containing the glass forming substance is passed. Expediently, the additional gas is oxygen.

In order to reduce the anisotropy, it is expedient and advantageous to change the direction of rotation of the tube each time the heating zone has traveled through its path on the tube. Under such circumstances, it is also expedient that if in respect to the consecutive changes in the direction of rotation, the new cycle or path of travel along a portion of the tube commences alternately with the tube in a rotary position which is different than the rotary position at the commencement or starting point of the path in the previous cycle. It is again expedient for the modified rotary position to be rotated by 180° relative to the rotary position at the beginning of the preceding cycle so that the starting points are displaced by 180° from each other.

In order to compensate for the symmetry, as frequently sufficient to proceed in such a manner that the direction of rotation of the tube is maintained relative to the direction of travel and at the beginning of each cycle of travel for the heating zone along a path of the tube, the rotary position of the starting point is rotated by 180° relative to the starting point of the preceding path of travel of the heating zone on the tube. Thus, it is sometimes desireable to change only the direction of rotation, or only the starting point for the commencement of the path of travel for the heating zone, or both.

Glass fibers which have been produced by the above described process of the present invention which reduces anisotropy, exhibit only a slight residual birefringence which is considerably less than that of fibers produced in the conventional manner. Expediently, a change in the direction of rotation is carried out whenever helical asymmetry is to be avoided.

In the proposed process, a particularly good cylindrical symmetry is achieved if, during the formation of the internally coated tube into a rod, an increased gas pressure is produced and is maintained in the interior of the section of the tube which is not yet been formed into the rod. This is expediently carried out in such a manner that during the formation of the rod, the increased gas pressure is produced and maintained by injecting a gas through an opening in the tube section.

It should be noted that the concept of producing and maintaining an increased gas pressure during the formation of the coated tube into a rod is known per se and is described in German O.S. 26 25 010. It is also noted that these procedures of producing and maintaining an increase gas pressure during the formation of the coated tube into a rod leads to an improved cylindrical symmetry of the fiber produced from this rod. However, the combination of these procedures which are fundamental to the invention with the measures which are known per se leads to an improved fiber.

BRIEF DESCRIPTION OF THE DRAWING

The FIGURE is a schematic illustration of a device for producing an internally coated tube in accordance with one of the proposed processes of the present invention.

DESCRIPTION OF THE PREFERRED EMBODIMENTS

The principles of the present invention are particularly useful in producing an internally coated glass tube which is subsequently formed into a rod and has a fiber drawn from an end thereof.

To accomplish this process, a quartz glass tube 1, which has a length of approximately one meter, an outer diameter of 20 mm, and inner diameter of 17 mm, is clamped horizontally in a clamping chuck 21 of a glass turning lathe 2. One end (the left end) of the tube 1 is connected to a gas supply by a rotatable connection 3. A quartz glass tube 4, which is 0.5 m long and has an inner diameter of 36 mm, is secured to the right hand end of the tube 1 by fusion and serves as a discharge tube. It is also noted that the tube 4 is rotatably supported in a chuck 22 of the lathe 2. Approximately 1100 Nml/min of pure oxygen is allowed to flow from the connection 3 through the tube 1 and out the discharge tube 4. A thin tube 5, which has a diameter of approximately 10 mm, extends into the discharge tube 4 and injects a second flow of oxygen at a rate of approximately 10 l/min into the right hand end of the tube 1. The total quantity of gas is drawn off from the open end of the tube 4.

The tube 1 is heated by two mobile gas burners 6 although only one is shown for purposes of clarity and is illustrated as being in a vertical plane. The gas burners are oxyhydrogen burners, which are provided with nozzle heads of approximately 50×10 mm and which are arranged in a horizontal plane and offset by 180°. Thus, the burners are directed towards the tube from both sides. The burners are moved at a speed of 15 cm/min along the tube 1 in a longitudinal portion or region 11, which extends between the clamping chuck 21 and the discharge tube 4. The burner 6 produces a local heating zone 12 in or on the tube 1, which zone has a maximum temperature of approximately 1900° K. and travels through the longitudinal direction. As a result of the heating, the tube 1 experiences a local softening and tends to collapse.

The quantity of gas which is fed into the right hand side of the tube 1 from the tube 5 is selected so that the diameter of the tube 1 will remain constant. At the end of one heating cycle or travel of the path or movement of the heating zone 12 in the portion 11, the burner is then returned to a starting position at the other end of the portion 11 which in the above described example is the left hand end without heating the tube. Before the next heating cycle, a change is made in the direction of rotation of the tube 1, which rotates at a rate of one rotation per second. When the tube 1 has reached a predetermined rotary position for a new starting point, the burner recommences and travels along the portion 11 in a longitudinal direction. After the completion of one heating cycle, the next cycle will commence with the tube 1 being in a rotary position so that the starting point of the path of the zone 12 has been rotated approximately 180° relative to the starting point for the previous path of travel.

After a few preliminary heating cycles, 90 Nml/min of SiCl$_4$ gas and 9 Nml/min of BCl$_3$ gas are mixed with the oxygen flowing into the tube from the connection 3 in order to form the glass layers which will become the cladding glass layer of the optical fiber. The core glass for the ultimately formed fiber is produced by restricting or interrupting the supply of BCl$_3$ and by reducing the amount of SiCl$_4$ gas to be one half. In the heated area of the tube 1, which zone is produced by the burners 6, the chlorides are converted into initially powdery oxides, which are glass forming substances and are deposited on the inner wall or surface of the tube 1. These oxides are then melted by the advancing heating zone 12 to form a clear glass layer having a thickness of several $\mu$m. The cladding glass for the fiber is formed by melting on approximately 50 layers of this kind of SiO$_2$-B$_2$O$_3$ glass and the core glass is formed from two layers of SiO$_2$ glass.

The finished tube, which was coated by this process, can now be deformed or collapsed into a rod. For this purpose, the burner speed is reduced in eight stages to 0.2 mm/sec. During this time gas continues to be injected from the pipe 5 into the pipe 4 and this injection of gas prevents the tube from collapsing too rapidly and irregularly. The rod produced in this way will be round. Chemical analysis indicates that the intermediate layer will have a B$_2$O$_3$ content of approximately 3 mol %.

From the rod formed by collapsing or deforming the tube, a fiber having a core diameter of 5 $\mu$m and an overall diameter of 65 $\mu$m can be drawn. In order to faciliate handling the fiber, directly following the drawing process, a polysiloxane synthetic coating is applied to the fiber. This optical fiber will have an index of refraction difference bewteen the core and cladding of $\Delta_n \approx 0.003$ and a core index of refraction of $n \approx 1.46$. From measurements determined from the remote field intensity, the fiber will possess monomode properties for light of a wavelength of 0.633 $\mu$m.

In order to carry out a polarization-optical investigation, a fiber portion having a length of 20 m was wound onto an angle coiled form, which possessed two winding planes which enclose the angles 90° and thus permit the compensation of the birefringence which takes place during winding as a result of curvature. The fiber wound in angled fashion was found to exhibit a phase shift of only 0.03°/m between the orthogonally polarized HE$_{11}$ mode status. Thus the shape-independent birefringence of the fiber is considerably less than that of the previously known prior art fiber.

The following considerations and facts are significant to the invention:

The polarization-optical investigation of a round fiber, which was produced simply by increasing the gas pressure during the deformation of the tube to form a rod, did show a clear reduction in the birefringence in comparison to the asymmetrical fiber although a residual birefringence and an optical activity remained. However, it was discovered that the observed phase shift was related to the rotation speed u of the tube and to the speed of the advance v of the heating zone. During a rotation the heating zone moves along a pitch v/u. In the fiber portion whose volume is equal to the volume of one pitch of the fiber blank, the phase shift frequently closely approximates 360°. Consequently it was conjectured that the birefringence is the outcome of the helical heating and deposition procedures.

Occasionally, the asymmetrical heating produces a core form which assumes a helical shape or screw shape. The pitch of the screw or helical shape corresponds to the ratio of the translation and rotation speed of the heating zone relative to the tube. If an internally coated tube is allowed to cool, the applied glass layer tends to form cracks due to its differing rate of thermal expansion. These cracks likewise extend as helical lines. Thus, it may be concluded that the production of the tube by this method leads to the formation of tension helix in the tube which can be considered to be the outcome of non-uniform doping.

In attempting to discover a remedy, the basic principal was discovered that the asymmetry of the individual layer may be compensated by an opposite asymmetry of the following layer or layers. This can be achieved by means of the procedures which include either changing the direction of rotation of the tube during formation of each succeeding layer or changing the initial rotary position for the starting point for the path of travel of the heating zone in the following cycle, or changing both the direction of rotation and the rotary position for the starting point of the path of travel of the heating zone.

A glass fiber which is produced in accordance with the method or process of the present invention will have only a slight residual birefringence which is considerably less than that of the fibers produced in a conventional manner. The proposed process facilitates the preparation of fibers which are close to being circularly symmetrical both in shape and in respect to the index of refraction profile. Thus, the polarization state of light, which is coupled into the fiber will be fundamentally maintained as it is conducted through the fiber or waveguide.

Although various minor modifications may be suggested by those versed in the art, it should be understood that we wish to embody within the scope of the patent granted hereon, all such modifications as reasonably and properly come within the scope of our contribution to the art.

We claim:

1. In a process for the production of glass fiber light waveguides, said process including a chemical vapor deposition process in which a glass layer is formed in a cycle including flowing a gas through a glass tube from one end to the other to deposit a glass forming substance on an inner surface of the tube and subsequently transforming the glass forming substance into a layer of glass, repeating the cycle to obtain the desired number of glass layers, subsequently forming the internally coated glass tube into a rod, and then drawing an optical fiber from an end of said rod, the improvements comprising during each cycle of depositing the glass forming substance and then transforming it into a glass layer, applying a gas pressure to the interior of the tube with the gas pressure being increased relative to the external environment of the tube, wherein the step of transforming the glass forming substance into a glass layer includes rotating the tube, locally heating the tube to create a heating zone to transform the deposit into the glass layer, moving the heating zone along a predetermined path on the tube, and selectively changing at least one of the direction of rotation of the tube and the rotary position of the starting point of the path after each cycle so that the effects of anisotropy of the glass layers is largely eliminated.

2. In a process according to claim 1, wherein the step of selectively changing comprises changing the direction of rotation at the completion of each cycle.

3. In a process according to claim 2, wherein the step of changing includes switching the initial starting point for the commencement of each path of the heating zone between a pair of rotary positions so that during one cycle the zone starts at one of said pair of positions and the next following cycle the zone starts at the other of said pair of positions.

4. In a process according to claim 3, wherein the pair of positions are rotated 180° relative to each other.

5. In a process according to claim 1, wherein the step of increasing the gas pressure comprises injecting additional gas into a tube at an end opposite to the end receiving the initial flow of gas containing the glass forming substance.

6. In a process according to claim 5, wherein the step of injecting additional gas comprises injecting oxygen.

7. In a process according to claim 1, wherein the step of changing a selected one of the direction of rotations and the position of rotation comprises maintaining the direction of rotation constant for each new cycle and changing the initial starting point for the path of the movement of the heating source for each cycle between a pair of rotary positions on said tube, said positions being rotated through 180° relative to each other.

8. In a process according to claim 1, wherein during the step of forming the internal coated tube into a rod, the process includes increasing and maintaining the gas pressure in the section of tube not yet formed into the rod.

9. In a process according to claim 8, wherein during the step of forming the tube into a rod the step of increasing and maintaining the gas pressure is accomplished by injecting a gas through an opening in the tube section.

10. In a process for the production of glass fiber light waveguides, said process including a chemical vapor deposition process in which a glass layer is formed in a cycle including flowing a gas through a glass tube from one end to the other to deposit a glass forming substance on an inner surface of the tube and subsequently transforming the glass forming substance into a layer of glass, repeating the cycle to obtain the desired number of glass layers, subsequently forming the internally coated glass tube into a rod, and then drawing an optical fiber from an end of said rod, the improvements comprising during each cycle of depositing the glass forming substance and then transforming it into a glass layer, applying a gas pressure to the interior of the tube with the gas pressure being increased relative to the external environment of the tube.

11. In a process according to claim 10, wherein the step of increasing the gas pressure comprises injecting additional gas into a tube at an end opposite to the end receiving the initial flow of gas containing the glass forming substance.

12. In a process according to claim 11, wherein the step of injecting additional gas comprises injecting oxygen.

* * * * *